(12) United States Patent
Nakajima et al.

(10) Patent No.: US 11,550,313 B2
(45) Date of Patent: Jan. 10, 2023

(54) EQUIPMENT ELEMENT MAINTENANCE ANALYSIS SYSTEM AND EQUIPMENT ELEMENT MAINTENANCE ANALYSIS METHOD

(71) Applicant: Panasonic Intellectual Property Management Co., Ltd., Osaka (JP)

(72) Inventors: Yuji Nakajima, Osaka (JP); Hitoshi Komatsu, Osaka (JP); Manabu Ohuchi, Osaka (JP); Kazuyuki Yoshidomi, Osaka (JP); Noritada Kawamoto, Osaka (JP); Hirofumi Koga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 541 days.

(21) Appl. No.: 16/032,095

(22) Filed: Jul. 11, 2018

(65) Prior Publication Data

US 2019/0025811 A1 Jan. 24, 2019

(30) Foreign Application Priority Data

Jul. 18, 2017 (JP) .............................. JP2017-138680

(51) Int. Cl.
G05B 23/02 (2006.01)
(52) U.S. Cl.
CPC ..... G05B 23/0283 (2013.01); G05B 23/0224 (2013.01); G05B 23/0267 (2013.01)
(58) Field of Classification Search
CPC ............ G05B 23/0283; G05B 23/0224; G05B 23/0267

(Continued)

(56) References Cited

U.S. PATENT DOCUMENTS

2002/0154491 A1* 10/2002 Suhara ............... H05K 13/0069
361/752
2005/0010323 A1* 1/2005 Cocciadiferro ....... B29B 7/7678
700/174

(Continued)

FOREIGN PATENT DOCUMENTS

| JP | 2001-223500 | * | 8/2001 |
| JP | 2004-140162 | | 5/2004 |

(Continued)

*Primary Examiner* — John H Le
(74) *Attorney, Agent, or Firm* — Pearne & Gordon LLP

(57) ABSTRACT

There is provided an equipment element maintenance analysis system including: a history information acquirer that is attached with at least one equipment element and acquires, at a predetermined timing, operation history information on a piece of manufacturing equipment for manufacturing a product; an error rate calculator that calculates an error rate based on the number of errors related to each of the at least one equipment element, included in the operation history information; a maintenance determiner that determines maintenance necessity of each of the at least one equipment element; and a notifier that notifies an information item on an equipment element determined to require maintenance among the at least one equipment. The error rate calculator calculates, as a latest error rate, an error rate in a latest predetermined period from the acquired operation history information, the maintenance determiner determines an equipment element with the latest error rate greater than or equal to a predetermined value among one or more equipment elements with a large number of errors as the equipment element that requires maintenance, the one or more equipment elements being included in the at least one equipment element, and the notifier lists the information on the equipment elements with a large number of errors in order, and notifies the number of errors and requirement of maintenance.

8 Claims, 6 Drawing Sheets

(58) Field of Classification Search
USPC .......................................................... 702/184
See application file for complete search history.

(56) References Cited

U.S. PATENT DOCUMENTS

| | | | | |
|---|---|---|---|---|
| 2006/0026474 | A1* | 2/2006 | Honda | ............... G03G 15/5075 |
| | | | | 714/728 |
| 2006/0271339 | A1* | 11/2006 | Fukada | .............. G05B 23/0213 |
| | | | | 702/185 |
| 2014/0324495 | A1* | 10/2014 | Zhou | ................ G06Q 10/06311 |
| | | | | 705/7.13 |
| 2016/0169771 | A1* | 6/2016 | Hiruta | ................ G05B 23/0243 |
| | | | | 702/183 |
| 2017/0010187 | A1 | 1/2017 | Morita | |

FOREIGN PATENT DOCUMENTS

| | | |
|---|---|---|
| JP | 2008-251714 A | 10/2008 |
| WO | 2015/114828 A1 | 8/2015 |
| WO | 2016/046967 A1 | 3/2016 |

* cited by examiner

| MAINTENANCE RECOMMENDED FEEDER LIST | | | | | | | | | |
|---|---|---|---|---|---|---|---|---|---|
| FEEDER NUMBER | COMPONENT NUMBER | DEVICE NUMBER | FEEDER ADDRESS | FEEDER POSITION | CUMULATIVE NUMBER OF TIMES OF SUCKING (TIMES) | CUMULATIVE NUMBER OF ERRORS (TIMES) | CUMULATIVE ERROR RATE (ppm) | NUMBER OF SUCTION ERRORS (TIMES) | NUMBER OF RECOGNITION ERRORS (TIMES) | NUMBER OF MOUNTING ERRORS (TIMES) |
| FA13 | D025 | mc02 | 005 | F | 4,214 | 555 | 131,703 | 3 | 552 | 0 |
| FD02 | R005 | mc03 | 027 | R | 15,123 | 486 | 32,136 | 224 | 262 | 0 |
| FB21 | C252 | mc02 | 015 | R | 12,564 | 321 | 25,549 | 0 | 321 | 0 |
| FC11 | R295 | mc01 | 008 | F | 285,123 | 234 | 821 | 183 | 51 | 0 |
| FC33 | C311 | mc02 | 026 | F | 2,264 | 203 | 89,664 | 51 | 152 | 0 |
| FA01 | T007 | mc03 | 011 | R | 23,774 | 175 | 7,361 | 0 | 174 | 1 |
| FA25 | R204 | mc01 | 016 | R | 82,560 | 118 | 1,429 | 84 | 34 | 0 |
| FE04 | C040 | mc01 | 029 | F | 4,452 | 98 | 22,013 | 78 | 18 | 2 |
| FC01 | R111 | mc02 | 006 | R | 12,321 | 92 | 7,466 | 24 | 68 | 0 |
| ... | ... | ... | ... | ... | ... | ... | ... | ... | ... | ... |

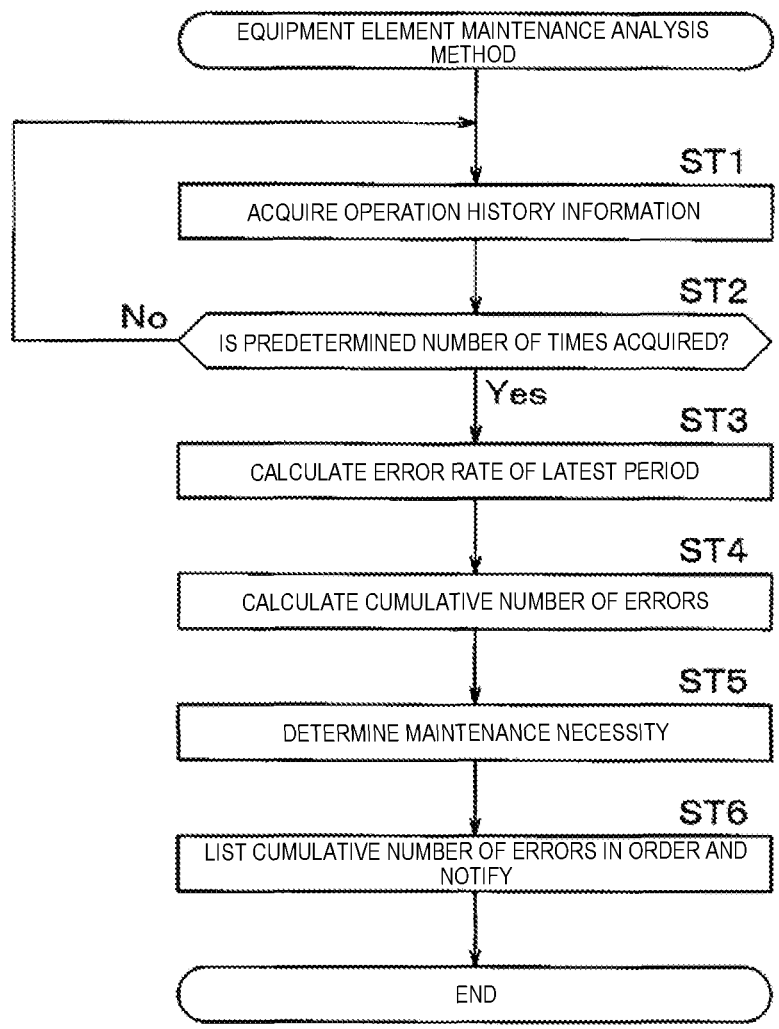

EQUIPMENT ELEMENT MAINTENANCE ANALYSIS SYSTEM AND EQUIPMENT ELEMENT MAINTENANCE ANALYSIS METHOD

BACKGROUND

1. Technical Field

The present disclosure relates to an equipment element maintenance analysis system and an equipment element maintenance analysis method for analyzing maintenance necessity of an equipment element that is attached to manufacturing equipment for manufacturing a product.

2. Description of the Related Art

Manufacturing equipment, such as a component mounter for manufacturing a product, is used in a state where replaceable equipment elements are selected and attached to according to the product. A component mounter for manufacturing a mounting board for installing an electronic circuit component on a circuit board as a product is used with a component supplier attached thereto for supplying electronic circuit components as an equipment element. In the equipment element, the wear or the distortion of the built-in configuration components increase with increasing time of use, and problems such as an operation error may occur.

Therefore, service operations including a maintenance operation such as cleaning and reference position adjustment for the equipment element, and a repair operation such as replacement of components are carried out at a predetermined service timing. In the service method described in Japanese Patent Unexamined Publication No. 2004-140162, operation status of each component mounter is monitored and when the number of times of component supply or the number of times of a supply error occurrence of the component supplier attached to the component mounter is equal to or greater than the set number of times, it is determined that service is required for the component supplier.

However, in Japanese Patent Unexamined Publication No. 2004-140162, even in a case where the service is not required at present since an unexpected error resulting from contaminants is naturally recovered or preventive maintenance is performed by a worker, it is determined that the service is required when the cumulative number of times of error occurrence is equal to or greater than a predetermined number of times. Therefore, there was room for further improvement.

An object of the present disclosure is to provide an equipment element maintenance analysis system and an equipment element maintenance analysis method that can analyze maintenance necessity of an equipment element appropriately.

SUMMARY

According to the present disclosure, there is provided an equipment element maintenance analysis system including: a history information acquirer that is attached with at least one equipment element and acquires, at predetermined timing, operation history information on a piece of manufacturing equipment for manufacturing a product; an error rate calculator that calculates an error rate based on the number of errors related to each of the at least one equipment element, included in the operation history information; a maintenance determiner that determines maintenance necessity of each of the at least one equipment element; and a notifier that notifies an information item on an equipment element determined to require maintenance among the at least one equipment element. The error rate calculator calculates, as a latest error rate, an error rate in a latest predetermined period from the acquired operation history information, the maintenance determiner determines an equipment element with the latest error rate greater than or equal to a predetermined value among one or more equipment elements with a large number of errors as the equipment element that requires maintenance, the one ore more equipment elements being included in the at least one equipment element and the notifier lists the information items on the one or more equipment elements with a large number of errors in order, and notifies the number of errors and requirement of maintenance.

According to the present disclosure, there is provided an equipment element maintenance analysis method of analyzing maintenance necessity of at least one equipment element that is attached to a piece of manufacturing equipment for manufacturing a product, the method including: acquiring operation history information on the piece of manufacturing equipment at a predetermined timing; calculating a latest error rate in a predetermined period from the acquired operation history information based on the number of error related to each of the at least one equipment element, included in the operation history information; determining an equipment element that has the latest error rate greater than or equal to a predetermined value among one or more equipment elements with a large number of errors as the equipment element that requires maintenance, the one or more equipment elements being included in the at least one equipment element; and listing the information items on the one or more equipment elements with a large number of errors in order, and notifying the number of errors and requirement of maintenance.

According to the present disclosure, the maintenance necessity of the equipment element can be analyzed efficiently.

BRIEF DESCRIPTION OF THE DRAWINGS

FIG. 5 is a table illustrating an example of maintenance recommended feeder list notified by the equipment element maintenance analysis system of the exemplary embodiment of the present disclosure; and FIG. 6 is a flowchart illustrating an equipment element maintenance analysis method by the equipment element maintenance analysis system of the exemplary embodiment of the present disclosure.

DETAILED DESCRIPTION

Figure 2:
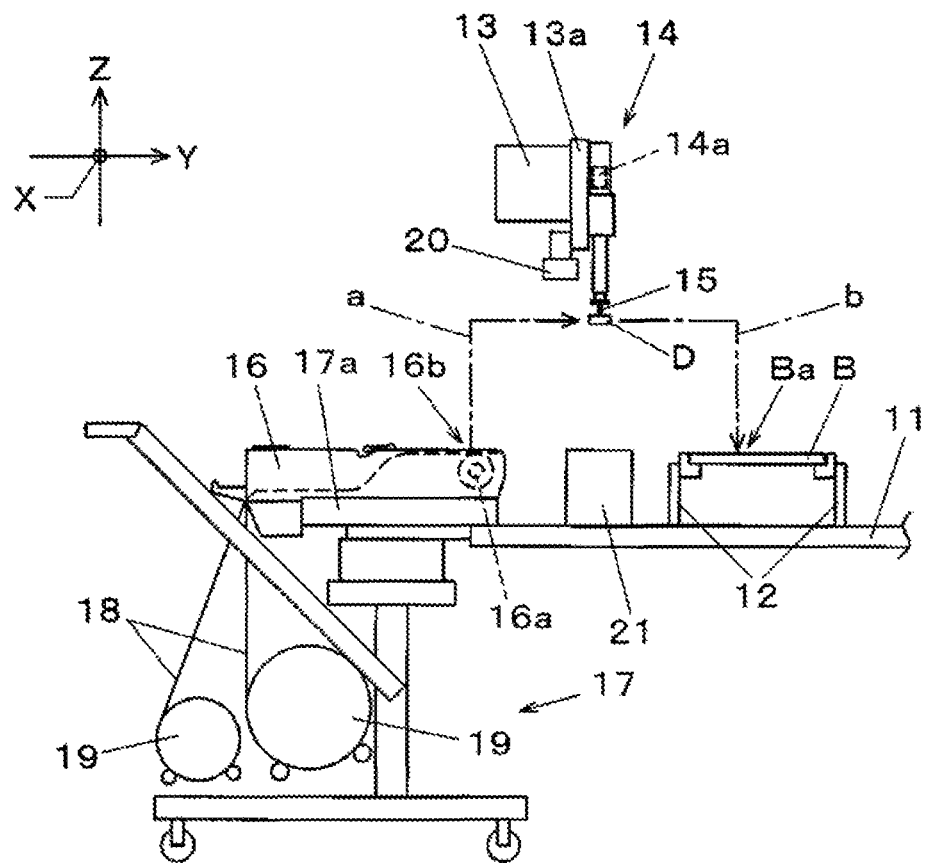
FIG. 2 is an explanatory diagram illustrating a configuration of a component mounter according to the exemplary embodiment of the present disclosure.

The present disclosure will be described below in detail with reference to the drawings. The configurations and the like described below are illustrative examples, and can be appropriately changed according to specifications such as an equipment element maintenance analysis system, a component mounting line, a component mounter, a component supplier, and the like. In the following, the corresponding elements are denoted by the same reference numerals in all the drawings, and redundant explanations are omitted. In FIG. 2 and a part to be described later, as two axial directions orthogonal to each other in a horizontal plane, X direction (the direction perpendicular to paper surface in FIG. 2) in the board transport direction and Y direction (the horizontal direction in FIG. 2) orthogonal to the board transport direction are illustrated. Further, Z direction (vertical direction in FIG. 2) is illustrated as a height direction orthogonal to the horizontal plane.

First, the configuration of equipment element maintenance analysis system 1 will be described with reference to FIG. 1. Equipment element maintenance analysis system 1 is configured with factory F and support center S established at a location away from factory F. In factory F, component mounting line L1, which is configured with a plurality of component mounters M1 to M3 connected to each other, is installed. Component mounting line L1 has a function of manufacturing a mounting board while sequentially installing electronic circuit components (hereinafter referred to as "component D", see FIG. 2) on circuit board B (see FIG. 2) by component mounters M1 to M3.

Each of component mounters M1 to M3 is connected to line management PC 3 via local communication network 2 such as a local area network (LAN). Mail receiver 4 that receives an e-mail sent from support center S is provided in factory F. A plurality of component mounting lines may be provided in factory F. The number of component mounters M1 to M3 constituting component mounting line L1 is not limited to 3, and may be 1 or 2, and 4 or more.

Figure 1:
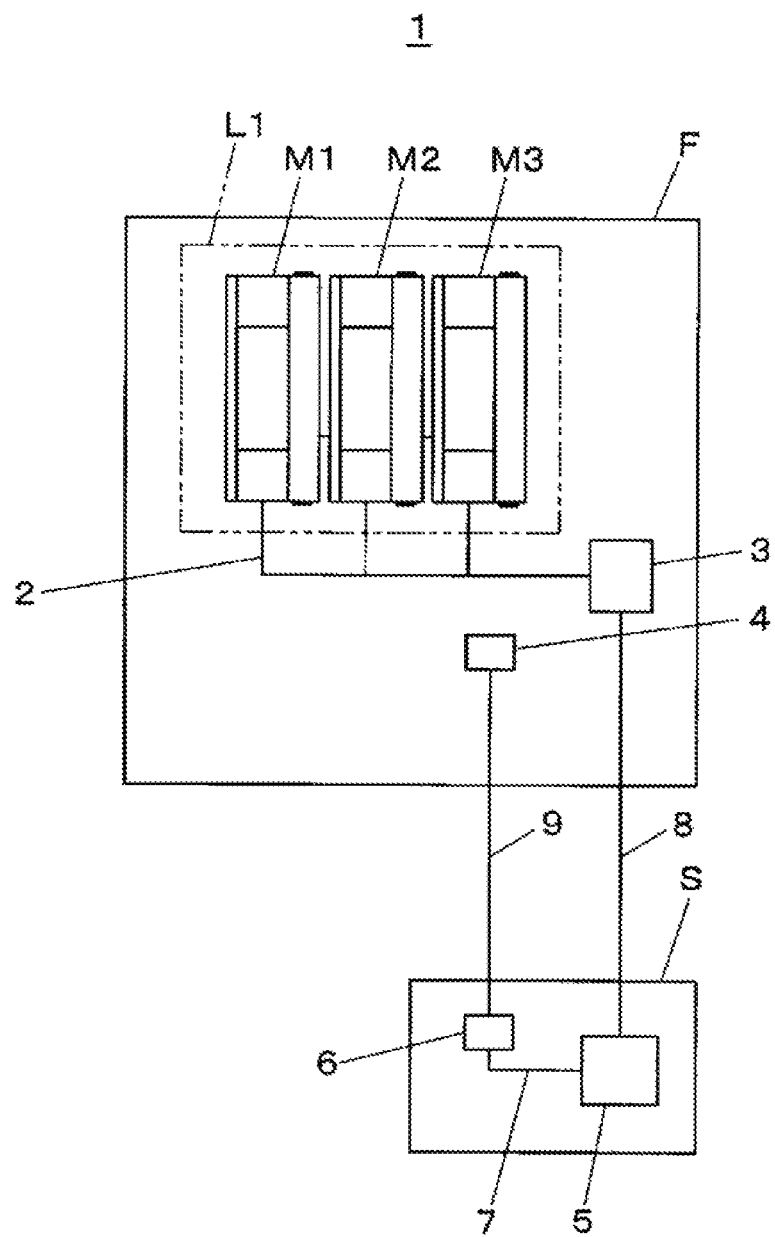
FIG. 1 is an explanatory diagram illustrating a configuration of an equipment element maintenance analysis system according to an exemplary embodiment of the present disclosure.

In FIG. 1, support center S is opened at a position where the analysis of maintenance necessity of the equipment element with respect to a plurality of factories F (customers), various supports to the person in charge of each factory F, and the like can be efficiently performed. Maintenance management PC 5 and mail server 6 are provided in support center S. Mail server 6 is connected to maintenance management PC 5 via local communication network 7 such as LAN. Line management PC 3 and maintenance management PC 5 exchange information via external communication network 8 such as the Internet or a mobile communication line. Mail receiver 4 and mail server 6 exchange information via external communication network 9. Line management PC 3 and maintenance management PC 5, and mail receiver 4 and mail server 6 may share the same external communication network. In other words, external communication network 8 and external communication network 9 may be the same external communication network.

Next, the configuration of component mounters M1 to M3 will be described with reference to FIG. 2. Component mounters M1 to M3 have a similar configuration, and component mounter M1 will be described below. Component mounter M1 has a function of installing component D on circuit board B. Board transport mechanism 12 provided on the upper surface of base 11 transports circuit board B in the X direction to position and hold circuit board B. Head moving mechanism 13 moves mounting head 14 installed via plate 13a in the X direction and the Y direction. Suction nozzle 15 is installed to a lower end of mounting head 14.

A plurality of tape feeders 16 are mounted side by side in the X direction on feeder base 17a provided on an upper portion of carriage 17 connected to base 11 on the side of board transport mechanism 12. A plurality of slots that installs tape feeder 16 are provided in feeder base 17a, and a feeder address is set in each slot. Component mounter M1 can install carriage 17 at two feeder positions on the front side and the rear side. In component mounter M1, install position of tape feeder 16 is specifiable based on feeder positions (front side and rear side) and a feeder address.

In carriage 17, carrier tape 18 for storing component D to be supplied to component mounter M1 is wound around and held by reel 19. Carrier tape 18 inserted into tape feeder 16 is pitch fed at a regular interval by tape feed mechanism 16a incorporated in tape feeder 16. As a result, component D stored in carrier tape 18 is sequentially supplied to component supply port 16b provided on an upper portion of tape feeder 16.

In a component mounting action, mounting head 14 moves above tape feeder 16 by head moving mechanism 13, and picks up component D supplied to component supply port 16b of tape feeder 16 by vacuum suction with suction nozzle 15 (arrow a). Mounting head 14 holding component D moves above circuit board B held with board transport mechanism 12 by head moving mechanism 13, and mounts component D at predetermined component install position Ba on circuit board B (arrow b).

In FIG. 2, board recognition camera 20 with an optical axis direction facing downward is attached to plate 13a. Board recognition camera 20 is moved in the X direction and Y direction integrally with mounting head 14 by head moving mechanism 13. Board recognition camera 20 is moved above tape feeder 16 to image component D supplied to component supply port 16b. The imaging result is subjected to image recognition, and a supply position deviation amount of supplied component D shifted from the expected normal supply position is calculated. Based on the calculated supply position deviation amount, a suction position (stop position of mounting head 14) when suction nozzle 15 picks up component D is corrected. In addition, a supply error in which component D is not supplied to component supply port 16b and component D cannot be recognized is also detected. In a case where component D is not shifted from the expected normal supply position, the supply position deviation amount may not be calculated.

In FIG. 2, mounting head 14 is provided with flow rate sensor 14a for measuring the flow rate of the air flowing from suction nozzle 15. When suction nozzle 15 sucks component D normally, the air flowing from suction nozzle 15 becomes smaller, and the vacuum pressure of suction nozzle 15 becomes lower. On the other hand, in a case where the suction mistake such as suction nozzle 15 being unable to hold component D, or component D being sucked by an abnormal posture occurs, the air flows in from suction nozzle 15 and the vacuum pressure of suction nozzle 15 does not decrease.

Therefore, the presence or absence of the occurrence of the suction mistake (suction error) can be detected from the measurement result of the flow rate of the air by flow rate sensor 14a. Instead of flow rate sensor 14a, a vacuum gauge may be provided to determine whether the suction mistake (suction error) occurs from the measurement result of the vacuum pressure by the vacuum gauge. By measuring the flow rate of the air flowing from suction nozzle 15 after mounting the component with flow rate sensor 14a, mounting error in which mounting head 14 brings back component D without being able to mount component D on circuit board B can be detected.

On an upper surface of base 11 between board transport mechanism 12 and tape feeder 16, component recognition camera 21 with the optical axis direction facing upward is attached. Component recognition camera 21 images a lower surface of component D (or suction nozzle 15 which could not hold component D) held by suction nozzle 15 when suction nozzle 15 which picks up component D passes through upward. The imaging result is subjected to image recognition, and it is determined whether the posture of component D held by suction nozzle 15 is normal or abnormal, or whether a recognition error in which component D held by suction nozzle 15 is unrecognizable occurs. Component recognition camera 21 may image a side surface of component D in addition to the lower surface thereof.

Also, the imaging result is subjected to image recognition, and the suction position deviation amount of component D sucked to suction nozzle 15 shifted from the expected normal suction position is calculated. When component D is mounted at component install position Ba on circuit board B, install position correction and install posture correction are performed based on the suction position deviation amount. In a case where component D is not shifted from the expected normal suction position, the suction position deviation amount may not be calculated.

Mounting head 14, suction nozzle 15, and tape feeder 16 are appropriately selected according to the types of components D mounted on circuit board B, and are attached to component mounter M1. In this way, mounting head 14 for mounting component D on circuit board B, suction nozzle 15 which is installed on mounting head 14 to suck component D, or tape feeder 16 (component supplier) for supplying component D to mounting head 14 becomes the equipment element attached to component mounter M1. Component mounter M1 becomes manufacturing equipment for manufacturing a product (mounting board) by being attached with at least one equipment element, sucking component D supplied from the component supplier with mounting head 14, recognizing the lower surface of sucked component D with component recognition camera 21, and mounting recognized component D on circuit board B.

Figure 3:
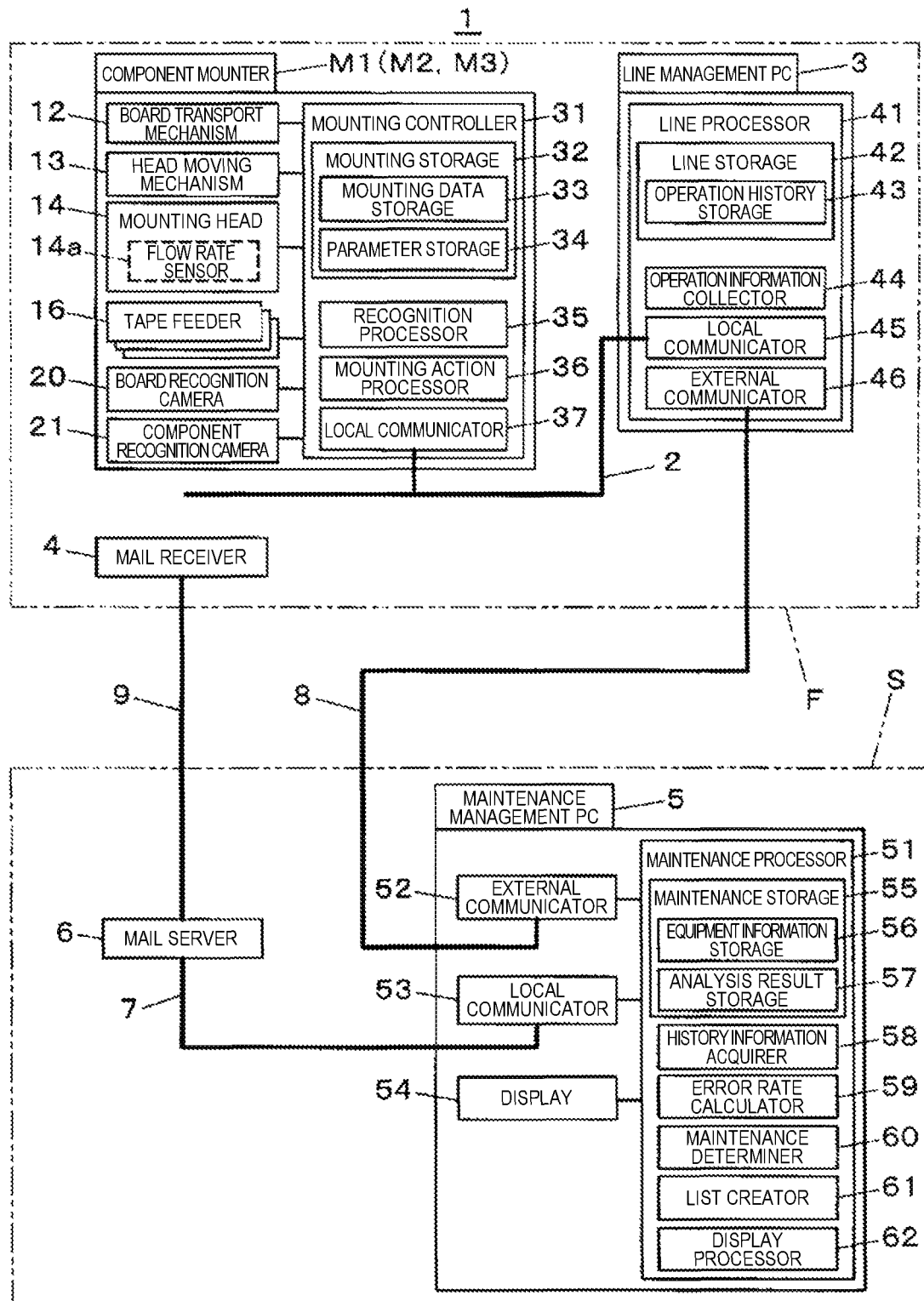
FIG. 3 is a block diagram illustrating a configuration of a processing system of the equipment element maintenance analysis system of the present disclosure.

A configuration of a processing system of equipment element maintenance analysis system 1 will be described with reference to FIG. 3. Component mounters M1 to M3 have a similar configuration, and component mounter M1 will be described below. In FIG. 3, component mounter M1 is provided with mounting controller 31. Mounting controller 31 is provided with mounting storage 32, recognition processor 35, mounting action processor 36, and local communicator 37. Local communicator 37 exchanges data with other component mounters M2 and M3, and line management PC 3 via local communication network 2. Mounting storage 32 is a storage device and is provided with mounting data storage 33 and parameter storage 34. Mounting data storage 33 is stored for each type of mounting board manufactured by data such as component type or size, and component install position Ba (XY coordinates) of component D mounted on circuit board B.

Recognition processor 35 performs image recognition on the imaging result of component supply port 16b of tape feeder 16 imaged by board recognition camera 20, calculates a correction value of the suction position of suction nozzle 15, and stores the result in parameter storage 34. Recognition processor 35 performs image recognition on the imaging result of suction nozzle 15 which picked up component D imaged by component recognition camera 21, calculates correction values of component install position Ba and a mounting posture when component D is mounted on circuit board B, and stores the result in parameter storage 34. Recognition processor 35 performs image recognition on the imaging result and detects the supply error and the recognition error.

In FIG. 3, mounting action processor 36 controls board transport mechanism 12, head moving mechanism 13, mounting head 14, and tape feeder 16 based on various types of data stored in mounting data storage 33 and various correction values stored in parameter storage 34 to perform the component mounting action. When an operation error to be described later is detected during the component mounting action, mounting action processor 36 transmits the occurrence time of the operation error, the contents of the operation error and the like to line management PC 3.

Mounting action processor 36 detects operation errors such as a suction error, a recognition error, a mounting error, and a supply error. Suction error is an error that suction nozzle 15 cannot suck component D. Recognition error is an error that component recognition camera 21 cannot recognize component D held by suction by suction nozzle 15. Mounting error is an error that mounting head 14 brings back component D without being able to mount component D on circuit board B. Supply error is an error that board recognition camera 20 cannot recognize component D supplied by tape feeder 16 (component supplier). In a case where component mounting line L1 is provided with a mounting inspection apparatus for inspecting component D mounted on circuit board B in addition to component mounters M1 to M3, the mounting error may be detected based on the presence or absence and the positional deviation amount of component D inspected by the mounting inspection apparatus.

In FIG. 3, line management PC 3 is provided with line processor 41. Line processor 41 is provided with line storage 42, operation information collector 44, local communicator 45, and external communicator 46. Local communicator 45 exchanges data with component mounters M1 to M3 via local communication network 2. External communicator 46 exchanges data with maintenance management PC 5 installed in support center S via external communication network 8. Line storage 42 is a storage device and is provided with operation history storage 43.

Operation information collector 44 stores the occurrence time of the operation error and the operation contents transmitted from component mounters M1 to M3 in operation history storage 43 in association with the information specifying the equipment element related to the operation error as an operation history information. In addition, operation information collector 44 collects the number of times of sucking and the number of times of mounting components D, the number of supply components supplied by tape feeder 16 (component supplier), and the like for each suction nozzle 15 at a predetermined timing such as every one hour in addition to the occurrence time of the operation error. Operation information collector 44 stores the collected number of times of sucking, number of times of mounting, number of supply components and the like in operation history storage 43 in association with the information specifying the equipment element as operation history information.

In FIG. 3, maintenance management PC 5 is provided with maintenance processor 51. Maintenance processor 51 is provided with external communicator 52, local communicator 53, display 54, maintenance storage 55, history information acquirer 58, error rate calculator 59, maintenance determiner 60, list creator 61, and display processor 62. Maintenance storage 55 is a storage device and is provided with equipment information storage 56 and analysis result storage 57. External communicator 52 exchanges data with line management PC 3 installed at factory F via external communication network 8. Local communicator 53 exchanges data with mail server 6 via local communication network 7. Display 54 is a display device such as a liquid crystal panel, and displays various data, information, and the like.

History information acquirer 58 acquires operation history information from line management PC 3 at a predetermined timing such as closing time of every day and changing time of workers in factory F. History information acquirer 58 stores the acquired operation history information in equipment information storage 56 for each equipment element as equipment information. History information acquirer 58 may acquire difference in operation history information updated from the previous acquisition per every single day, or acquire operation history information on a predetermined analysis target period such as one week collectively. That is, information on an analysis target period sufficient for analyzing the maintenance necessity of each equipment element may be stored in equipment information storage 56.

In FIG. 3, error rate calculator 59 calculates an error rate based on the number of errors of operation errors and the number of times of sucking related to the equipment element included in the operation history information. At that time, error rate calculator 59 calculates the error rate for a predetermined period such as one day, and stores the result in analysis result storage 57. Maintenance determiner 60 determines the maintenance necessity of the equipment element based on operation history information stored in equipment information storage 56 and the analysis results such as the error rate stored in analysis result storage 57. More specifically, maintenance determiner 60 accumulates the number of errors of the operation error related to the equipment element generated during the analysis target period such as one week, and determines the equipment element whose latest error rate on a predetermined period such as latest two days is greater than or equal to a warning error rate (predetermined value) among the equipment elements with a large number of errors as an equipment element that requires maintenance.

Figure 4A:
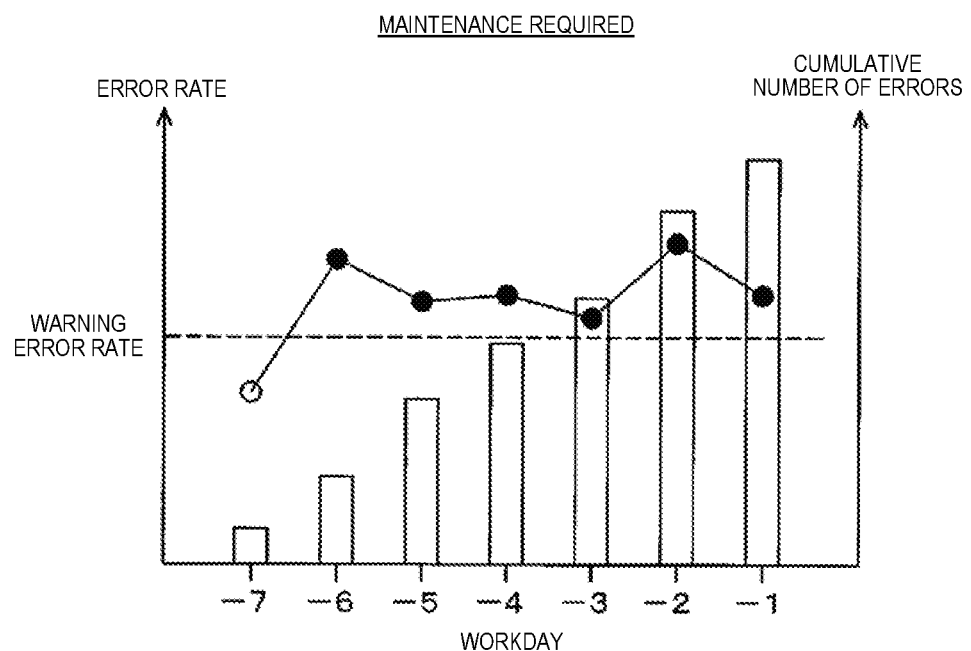
FIG. 4A is an explanatory diagram illustrating an example of operation history information on a tape feeder determined to require maintenance by the equipment element maintenance analysis system of the exemplary embodiment of the present disclosure.
Figure 4B:
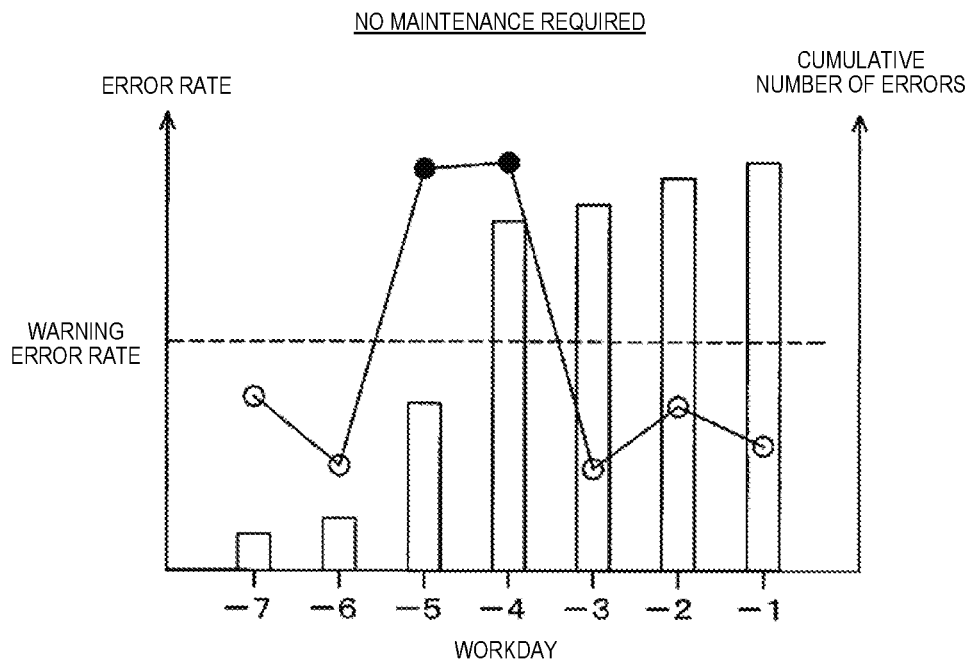
FIG. 4B is an explanatory diagram illustrating an example of operation history information on a tape feeder determined to require no maintenance by the equipment element maintenance analysis system of the exemplary embodiment of the present disclosure.

An example of maintenance necessity determined by maintenance determiner 60 will be described with reference to FIGS. 4A and 4B. Cumulative number of errors (bar graph) for seven workdays and the error rate (line graph) for each workday of tape feeder 16 determined to require maintenance and cumulative number of errors (bar graph) for seven workdays and the error rate (line graph) for each workday of tape feeder 16 determined to require no maintenance are illustrated in FIGS. 4A and 4B respectively. The cumulative number of errors is displayed by accumulating operation errors related to tape feeder 16 from seven workdays ago. The error rate is indicated by indicating the case of the error rate of work errors related to tape feeder 16 greater than or equal to the warning error rate with black circles and the case of the error rate lower than the warning error rate with white circles for each workday.

The error rate of tape feeder 16 illustrated in FIG. 4A is lower than the warning error rate seven workdays ago, but exceeds the warning error rate from six workdays ago. That is, since the error rate of the latest two days (two workdays ago and one workday ago) is greater than or equal to the warning error rate respectively, maintenance determiner 60 determines "maintenance required". The error rate of tape feeder 16 illustrated in FIG. 4B exceeds the warning error rate six workdays ago and five workdays ago unexpectedly, but the error rate is lower than the warning error rate after four workdays because the problem is solved by removing the contaminants as a cause. Therefore, the error rate for the latest two days is not greater than or equal to the warning error rate, and maintenance determiner 60 determines "no maintenance required".

In FIG. 3, list creator 61 creates a list (maintenance recommended equipment element list) of an equipment element that requires maintenance based on operation history information stored in equipment information storage 56, analysis results such as an error rate stored in analysis result storage 57, and maintenance necessity determined by maintenance determiner 60.

The created maintenance recommended equipment element list is stored in analysis result storage 57, and is transmitted to mail receiver 4 installed in factory F as an e-mail via mail server 6. That is, mail server 6 becomes a communicator that sends an e-mail containing information on the equipment element that is determined to require maintenance. List creator 61 and mail server 6 (communicator) list information on the equipment elements with a large number of errors in order and become notifier 10 that notifies the information of the equipment element that is determined to require maintenance including the number of errors and the necessity of maintenance. Accordingly, it is possible to transmit information on which equipment elements requiring maintenance is displayed in descending order of priority to the person in charge of factory F, and to improve productivity by performing the maintenance necessity of the equipment elements efficiently.

An example of a maintenance recommended feeder list that is the maintenance recommended equipment element list of tape feeder 16 will be described with reference to FIG. 5. The maintenance recommended feeder list includes "feeder number", "component number", "device number", "feeder address", and "feeder position". "Feeder number" specifies tape feeder 16. "Component number" specifies component D supplied by tape feeder 16. "Device number" specifies component mounters M1 to M3 on which tape feeder 16 is installed. "Feeder address" specifies the position of tape feeder 16 installed on feeder base 17a. "Feeder position" specifies the position of carriage 17 installed on component mounters M1 to M3.

The maintenance recommended feeder list also includes "cumulative number of times of sucking", "cumulative number of errors", and "cumulative error rate". "Cumulative number of times of sucking" is a total of the number of times of sucking that suction nozzle 15 sucked component D supplied by tape feeder 16 during the analysis target period (for example, one week). "Cumulative number of errors" is a total of operation errors related to tape feeder 16 generated during the analysis target period. "Cumulative error rate" is obtained by dividing the cumulative number of errors by cumulative number of times of sucking" The maintenance recommended feeder list also includes "number of suction errors" that is a total of suction error, "number of recognition errors" that is a total of the recognition error, and "number of mounting errors" that is a total of mounting errors. The total of the number of suction errors, the number of recognition errors, and the number of mounting errors is the cumulative number of errors.

It is not necessary to include all the number of suction errors, the number of recognition errors, and the number of mounting errors in the breakdown of cumulative number of errors. That is, the cumulative number of errors may include at least one number of suction errors caused by suction nozzle 15 mounted on mounting head 14, recognition errors of component D caused by component recognition camera 21, and mounting errors caused by mounting head 14.

The maintenance recommended feeder list is listed in descending order of the cumulative number of errors in FIG. 5. The feeder number, the component number, the device number, the feeder address, and the feeder position specifying tape feeder 16 (five in here) with an error rate of the latest two days greater than or equal to the warning error rate and determined as "maintenance required" by maintenance determiner 60 are shaded. The person in charge of factory F notified with the maintenance recommended feeder list can perform maintenance operation efficiently by performing the maintenance operation in the order of shaded maintenance required tape feeder 16 from the top.

In FIG. 3, display processor 62 performs display processing of displaying the maintenance recommended equipment element list created by list creator 61 on display 54. That is, display 54 displays information on the equipment element determined to require maintenance. List creator 61, display processor 62, and display 54 list information on equipment element with a large number of errors in order, and become notifier that notifies information on the equipment element determined to require maintenance including the number of errors and the necessity of maintenance. As a configuration of equipment element maintenance analysis system 1, maintenance management PC 5 may be disposed in factory F, the information on equipment element determined to require maintenance may be displayed on display 54 disposed in factory F, and the information on the equipment element that requires maintenance may be transmitted to the person in charge of factory F.

Next, an equipment element maintenance analysis method for analyzing the maintenance necessity of the equipment element by equipment element maintenance analysis system 1 will be described with reference to FIG. 6. First, history information acquirer 58 of maintenance management PC 5 acquires operation history information on component mounters M1 to M3 (manufacturing equipment) that configures component mounting line L1 installed in factory F from line management PC 3 installed in factory F at a predetermined timing such as once a day (ST1: operation history information acquisition step). The acquired operation history information is stored in equipment information storage 56.

When operation history information on a predetermined analysis target period (for example, one week) is acquired by repeating the operation history information acquisition step (ST1) for a predetermined times (for example, seven times) (Yes in ST2), error rate calculator 59 calculates the error rate from the acquired operation history information in the latest predetermined period (for example, latest two days) based on the number of errors of the operation error related to the equipment element included in the operation history information (ST3: latest error rate calculation step). Next, maintenance determiner 60 calculates the cumulative number of errors on the analysis target period (ST4: cumulative number of errors calculation step), and determines the equipment element with the latest error rate greater than or equal to a predetermined value (warning error rate) among the equipment elements with a large number of errors as the equipment that requires maintenance (ST5: maintenance necessity determination step). Accordingly, maintenance necessity of equipment element can be analyzed efficiently.

In FIG. 6, list creator 61 lists the information on the equipment element with a large number of errors in order, and mail server 6 sends an e-mail containing the information on the equipment element determined to require maintenance including the number of errors and the necessity of maintenance to notify (ST6: notification step). In notification step (ST6), display processor 62 may display information on the equipment element determined to require maintenance including the number of errors and the necessity of maintenance on display 54 to notify. Accordingly, it is possible to notify information displayed on an equipment element that requires maintenance listed in a descending order of priority to the person in charge of factory F.

As described above, equipment element maintenance analysis system 1 of present exemplary embodiment includes history information acquirer 58 that acquires operation history information on manufacturing equipment at a predetermined timing, error rate calculator 59 that calculates an error rate based on the number of errors related to the equipment element included in the operation history information, maintenance determiner 60 that determines the maintenance necessity of the equipment element, and notifier 10 that notifies information on the equipment element determined to require maintenance.

Error rate calculator 59 calculates the error rate from the operation history information in the latest predetermined period. Maintenance determiner 60 determines an equipment element with the latest error rate greater than or equal to a predetermined value (warning error rate) among the equipment elements with a large number of errors as an equipment element that requires maintenance. Notifier 10 lists information on the equipment element with a large number of errors in order, and notifies the number of errors and the necessity of maintenance. Accordingly, it is possible to analyze maintenance necessity of the equipment element appropriately. It is possible to analyze the maintenance necessity using appropriate information from the large amount of information transmitted from factory F in support center S.

The above description is made using tape feeder 16 as an equipment element of which maintenance necessity is determined, but the equipment element of which maintenance necessity is determined is not limited to tape feeder 16. For example, maintenance necessity of suction nozzle 15 or mounting head 14 can be analyzed by calculating the cumulative number of errors and the latest error rate and determining the maintenance necessity based on the number of errors of operation errors related to suction nozzle 15 or mounting head 14. Even if operation history information cannot be acquired on any date during the analysis target period, the latest error rate may be calculated from the operation history information on the latest date among the acquired dates. In the above description, the operation history information is analyzed collectively on a daily bases, but the operation history information may be analyzed collectively on a production lot basis.

The equipment element maintenance analysis system and the equipment element maintenance analysis method of the present disclosure have an effect of analyzing maintenance necessity of an equipment element appropriately, and are useful in a field mounting components on a board.

What is claimed is:

1. An equipment element maintenance analysis system for operating a component mounter comprising a component recognition camera configured to image a side surface of a component, a mounting head configured to mount a component on a circuit board, and a suction nozzle installed on the mounting head and configured to suck the component, the system comprising:
a processor configured to:
acquire, at a predetermined timing, operation history information on a plurality of equipment elements of the component mounter for manufacturing a product, wherein the plurality of equipment elements includes the component recognition camera, the mounting head, and the suction nozzle;
calculate an error rate based on a number of errors related to each of the plurality of equipment elements, included in the operation history information storing a suction error occurred by the suction nozzle, a mounting error occurred by the mounting head and a recognition error occurred by component recognition camera;
wherein the processor is further configured to, for each of the component recognition camera, the mounting head, and the suction nozzle:
calculate a first latest error rate for one equipment element of the component mounter in a first latest predetermined period from the acquired operation history information,
calculate a second latest error rate for the one equipment element of the component mounter in a second latest predetermined period from the acquired operation history information, the second latest predetermined period being shorter and more recent than the first latest predetermined period,
when the first latest error rate and the second latest error are higher than a predetermined value, determine the one equipment element to receive maintenance,
when the first latest error rate is higher than the predetermined value and the second latest error rate is lower than the predetermined value, determine the one equipment element not to receive maintenance,
wherein the processor is further configured to notify one or more of the component recognition camera, the mounting head, or the suction nozzle as an equipment element determined to receive maintenance as a result of comparing the first and second latest error rates.

2. The equipment element maintenance analysis system of claim 1,
further comprising a communicator configured to send an electronic mail containing an information item on the equipment element determined to require maintenance.

3. The equipment element maintenance analysis system of claim 1, further comprising a display that displays information on the one equipment element determined to require maintenance.

4. The equipment element maintenance analysis system of claim 1,
wherein the plurality of equipment elements include a component supplier that supplies a component,
wherein the component mounter is configured to suck the component supplied from the component supplier by a mounting head, recognize a lower surface of the sucked component with a component recognition camera, and mount the recognized component on a circuit board.

5. An equipment element maintenance analysis method of analyzing maintenance necessity of a plurality of equipment elements are attached to a component mounter for manufacturing a product, the method comprising:
acquiring operation history information on the plurality of equipment elements at a predetermined timing, wherein the plurality of equipment elements include:
a component recognition camera configured to image a side surface of a component;
a mounting head configured to mount a component on a circuit board; and
a suction nozzle installed on the mounting head and configured to suck the component;
calculating an error rate based on a number of errors related to each of the plurality of equipment elements, included in the operation history information, wherein the errors include a suction error occurred by the suction nozzle, a mounting error occurred by the mounting head and a recognition error occurred by component recognition camera;
for each of the plurality of the equipment elements:
calculating a first latest error rate in a first latest predetermined period from the acquired operation history information based on a number of errors related to one equipment element, included in the operation history information;
calculating a second latest error rate for the one equipment element of the component mounter in a second latest predetermined period from the acquired operation history information, the second latest predetermined period being shorter and more recent than the first latest predetermined period,
when the first latest error rate and the second latest error are higher than a predetermined value, determining to conduct the one equipment element to receive maintenance, and
when the first latest error rate is higher than the predetermined value and the second latest error rate is lower than the predetermined value, determining the one equipment element not to receive maintenance; and
listing information items on the plurality of equipment elements with a respective number of errors in order, and notifying one of the component recognition camera, the mounting head, and the suction nozzle as an equipment element determined to receive maintenance as a result of comparing the first and second latest error rates with a corresponding number of errors.

6. The equipment element maintenance analysis method of claim 5,
wherein an information item on the equipment element determined to receive maintenance is notified by sending an e-mail containing the information item.

7. The equipment element maintenance analysis method of claim 5,
wherein the information on the equipment element determined to receive maintenance is notified by displaying the information on a display.

8. The equipment element maintenance analysis method of claim 5,
wherein the plurality of equipment elements includes a component supplier that supplies a component,
wherein the component mounter is configured to suck the component supplied from the component supplier by a mounting head, recognize a lower surface of the sucked component with a component recognition camera, and mount the recognized component on a circuit board.

* * * * *